United States Patent
Hatton

[15] 3,696,559
[45] Oct. 10, 1972

[54] AGRICULTURAL PRODUCT AND PROCESS

[72] Inventor: John H. Hatton, 5275 Craner Avenue, North Hollywood, Calif. 91601

[22] Filed: Aug. 7, 1970

[21] Appl. No.: 62,136

[52] U.S. Cl. ...................................................... 47/9
[51] Int. Cl. .............................................. A01g 7/00
[58] Field of Search ...................... 47/9, 58, DIG. 10

[56] References Cited

UNITED STATES PATENTS

| 3,482,353 | 12/1969 | Fischer et al. | 47/9 |
| 2,961,799 | 11/1960 | Coe | 47/9 |
| 3,017,720 | 1/1962 | Busch | 47/58 |
| 3,094,809 | 6/1963 | Kaufman et al. | 47/9 |

*Primary Examiner*—Robert E. Bagwill
*Attorney*—Jack C. Munro

[57] ABSTRACT

An improved agricultural product and process are provided which serve to stabilize soil and help to prevent wind and water erosion, and which also aid in germination. The product of the invention has the property of causing the soil to retain moisture and to prevent excessive dehydration of the soil. When applied with mulch, the product of the invention has the property of expanding the mulch and of minimizing the amount of mulch required for a particular application. The product comprises a water soluble gum selected from a certain group, as will be described.

1 Claim, No Drawings

AGRICULTURAL PRODUCT AND PROCESS

BACKGROUND OF THE INVENTION

Conventional agricultural processes for providing ground cover on flat or inclined soil areas usually involve spraying a mixture of seed, fertilizer and mulch in a water spray over the area. The improved process of the present invention, in one of its aspects, comprises mixing a particular mucilage or gum, or mixture of mucilages or gums, into the aforesaid mixture so as to enhance the results of the process.

As mentioned above, when the process of the present invention is practiced, it has been found that the effectiveness of the mulch is expanded so that significantly lesser amounts of the mulch may be used for any particular application. It has also been found that the soil being treated is more stabilized when the process of the invention is practiced, and that wind or water erosion is minimized. Also, the resulting product serves as a binder and water retaining agent for the soil.

The process of the invention has been found to be most effective when practiced by the application of a mixture of mulch and the selected mucilage over the soil in a water spray. Specifically, the mucilage may be mixed into the mixture of fertilizer, mulch and seed which is usually used in commercial processes, and the resulting mixture is sprayed over the soil in a water spray. However, the mucilage may be applied to the soil in other ways, and may be applied either wet or dry.

SPECIFIC DESCRIPTION OF ONE EMBODIMENT OF THE

PROCESS OF THE INVENTION

In the practice of the process of the invention in a specific embodiment, the mucilage of the plantago seed is mixed with an appropriate mulch in the following proportions:

| | |
|---|---|
| Mucilage | 50 lbs. per acre |
| Mulch | 1,000 lbs. per acre |

The mucilage/mulch mixture is then mixed with appropriate fertilizer and seed in the following proportions:

| | |
|---|---|
| Fertilizer | 500 lbs. per acre |
| Seed | 75 lbs. per acre |
| Water | 3,000 gallons per acre |

Although plantago seed gum, or mucilage has been referred to above, any of the following water soluble gums are effective:

Tree Gums: Tragacanth, Karaya, Arabic, Ghatti;
Seed Gums: Plantago, Guar, Locust Bean, Tamarind;
Marine Gums: Agar, Irish Moss, Alginates.

As mentioned above, the gums or mucilage may be applied in dry or wetted form, alone, or mixed with seed, mulch and fertilizer. When so used the product serves to affix the seed, mulch and fertilizer to the soil surface and protect against water and wind erosion. The product also reduces dehydration or loss of moisture from the soil.

It helps as a dispensing agent by expanding the mulch. It enhances seed germination by reducing moisture evaporation and resulting reduction of ground temperatures.

Therefore, while particular embodiments of the invention have been described, it is obvious that modifications may be practiced. The following claims are intended to cover all modifications which fall within the scope of the invention.

What is claimed is:

1. A product for treating soils to reduce erosion thereof and aid in germination of plant seeds, comprising:

| | |
|---|---|
| Plantago Seed Gum | 50 pounds |
| Mulch | 1000 pounds |
| Fertilizer | 500 pounds |
| Seed | 75 pounds |
| Water | 3000 gallons. |

2. A product for treating soils to reduce errosion thereof and aid in germination of plant seeds, comprising:

| | |
|---|---|
| Guar Gum | 50 pounds |
| Mulch | 1000 pounds |
| Fertilizer | 500 pounds |
| Seed | 75 pounds |
| Water | 3000 gallons. |

* * * * *